(12) United States Patent
Ronen (10) Patent No.: US 12,498,571 B2
(45) Date of Patent: Dec. 16, 2025

(54) COMPOUND LIGHT-GUIDE OPTICAL ELEMENTS

(71) Applicant: Lumus Ltd., Ness Ziona (IL)

(72) Inventor: Eitan Ronen, Rechovot (IL)

(73) Assignee: Lumus Ltd., Ness Ziona (IL)

( * ) Notice: Subject to any disclaimer, the term of this patent is extended or adjusted under 35 U.S.C. 154(b) by 379 days.

(21) Appl. No.: 18/026,138

(22) PCT Filed: Oct. 1, 2021

(86) PCT No.: PCT/IL2021/051185
§ 371 (c)(1),
(2) Date: Mar. 14, 2023

(87) PCT Pub. No.: WO2022/070197
PCT Pub. Date: Apr. 7, 2022

(65) Prior Publication Data
US 2023/0359034 A1    Nov. 9, 2023

Related U.S. Application Data

(60) Provisional application No. 63/114,110, filed on Nov. 16, 2020, provisional application No. 63/086,136, filed on Oct. 1, 2020.

(51) Int. Cl.
G02B 27/01 (2006.01)
F21V 8/00 (2006.01)
G02B 27/28 (2006.01)

(52) U.S. Cl.
CPC ....... *G02B 27/0172* (2013.01); *G02B 6/0013* (2013.01); *G02B 6/0033* (2013.01); *G02B 27/283* (2013.01); *G02B 2027/0178* (2013.01)

(58) Field of Classification Search
CPC .......... G02B 2027/0178; G02B 6/0013; G02B 6/0033
See application file for complete search history.

(56) References Cited

U.S. PATENT DOCUMENTS 2,748,659 A    6/1956  Geffcken et al.
2,795,069 A    6/1957  Hardesty
(Continued)

FOREIGN PATENT DOCUMENTS

JP    3389360 B2  *  3/2003

OTHER PUBLICATIONS

S.Chattopadhyay el al: "Anti-reflecting and photonic nanostructures", Materials Science and Engineering: R: Repots, ol. 69, No. 1-3, Jun. 20, 2010, pp. 1-35.
(Continued)

*Primary Examiner* — Jessica M Merlin
(74) *Attorney, Agent, or Firm* — Rivka Friedman (57) ABSTRACT

An optical system (100) for directing an image towards a user for viewing includes a light-guide optical element (LOE) (10) having parallel major external surfaces (11a, 11b) for supporting propagation of an image by internal reflection, a coupling-out arrangement for coupling out the image towards an eye of the user, and a coupling-in aperture. An image projector (114) includes an image generator (32) for generating an image, collimating optics (31) for collimating the image, and an image conjugate generator (20, 33, 34). The image projector is coupled to the coupling-in aperture so as to introduce both the collimated image and its conjugate image into the LOE prior to the images impinging on either of major external surfaces. The image conjugate generator may be a second image generator (33), or may employ one or more reflecting surface (22, 23, 24, 34) non-contiguous with the major external surfaces of the LOE.

10 Claims, 8 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,940,204 A | 2/1976 | Withrington |
| 4,084,883 A | 4/1978 | Eastman et al. |
| 4,191,446 A | 3/1980 | Arditty et al. |
| 4,241,382 A | 12/1980 | Daniel |
| 4,309,070 A | 1/1982 | St Leger Searle |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,619,601 A | 4/1997 | Akashi et al. |
| 5,650,873 A | 7/1997 | Gal et al. |
| 5,680,209 A | 10/1997 | Maechler |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,762,801 B2 | 7/2004 | Weiss et al. |
| 6,799,859 B1 | 10/2004 | Ida et al. |
| 6,805,490 B2 | 10/2004 | Levola |
| 6,829,095 B2 | 12/2004 | Amitai |
| 7,778,508 B2 | 8/2010 | Hirayama |
| 8,369,019 B2 | 2/2013 | Baker et al. |
| 8,472,119 B1 | 6/2013 | Kelly |
| 8,531,773 B2 | 9/2013 | DeJong |
| 8,649,099 B2 | 2/2014 | Schultz et al. |
| 8,655,178 B2 | 2/2014 | Capron et al. |
| 8,760,762 B1 | 6/2014 | Kelly |
| 8,870,384 B2 | 10/2014 | Imai et al. |
| 9,285,591 B1 | 3/2016 | Gupta et al. |
| 9,798,061 B2 | 10/2017 | Hsiao et al. |
| 9,805,633 B2 | 10/2017 | Zheng et al. |
| 10,330,938 B2 | 6/2019 | Cheng et al. |
| 10,437,066 B2 | 10/2019 | Dobschal |
| 10,437,068 B2 | 10/2019 | Weng |
| 10,480,725 B2 | 11/2019 | Streppel |
| 10,480,772 B2 | 11/2019 | Forest |
| 10,480,775 B2 | 11/2019 | Streppel |
| 10,678,055 B2 | 6/2020 | Edwin |
| 10,725,291 B2 | 7/2020 | Chi et al. |
| 11,009,704 B2 | 5/2021 | Ayres et al. |
| 11,187,902 B2 | 11/2021 | Urness et al. |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2005/0017465 A1 | 1/2005 | Bergstrom |
| 2005/0018308 A1 | 1/2005 | Cassarly et al. |
| 2005/0084210 A1 | 4/2005 | Cha |
| 2005/0174658 A1 | 8/2005 | Long et al. |
| 2005/0180687 A1 | 8/2005 | Amitai |
| 2005/0265044 A1 | 12/2005 | Chen et al. |
| 2006/0268421 A1 | 11/2006 | Shimizu et al. |
| 2007/0002191 A1 | 1/2007 | Hashizume et al. |
| 2007/0007085 A1 | 1/2007 | Wang |
| 2007/0007157 A1 | 1/2007 | Buschmann et al. |
| 2007/0064310 A1 | 3/2007 | Mukawa et al. |
| 2007/0070859 A1 | 3/2007 | Hirayama |
| 2007/0086712 A1 | 4/2007 | Shani |
| 2007/0165192 A1 | 7/2007 | Prior |
| 2008/0094586 A1 | 4/2008 | Hirayama |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0239422 A1 | 10/2008 | Noda |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0020204 A1 | 1/2010 | Fleischer et al. |
| 2010/0027289 A1 | 2/2010 | Aiki et al. |
| 2010/0067110 A1 | 3/2010 | Amitai et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0278480 A1 | 11/2010 | Vasylyev |
| 2010/0291489 A1 | 11/2010 | Moskovits et al. |
| 2011/0176218 A1 | 7/2011 | Noui |
| 2011/0194163 A1 | 8/2011 | Shimizu et al. |
| 2012/0039576 A1 | 2/2012 | Dangel et al. |
| 2012/0044572 A1 | 2/2012 | Simmonds et al. |
| 2012/0147361 A1 | 6/2012 | Mochizuki et al. |
| 2012/0179369 A1 | 7/2012 | Lapidot et al. |
| 2012/0206817 A1 | 8/2012 | Totani |
| 2012/0306940 A1 | 12/2012 | Machida et al. |
| 2013/0007833 A1 | 1/2013 | Kitazato et al. |
| 2013/0025043 A1 | 1/2013 | Hui et al. |
| 2013/0229717 A1 | 9/2013 | Amitai |
| 2013/0250430 A1 | 9/2013 | Robbins et al. |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2013/0335975 A1 | 12/2013 | Park |
| 2014/0003762 A1 | 1/2014 | Macnamara |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0013105 A1 | 1/2015 | Kuan |
| 2015/0016777 A1 | 1/2015 | Abovitz et al. |
| 2015/0081313 A1 | 3/2015 | Boross et al. |

(56) References Cited

U.S. PATENT DOCUMENTS

| | | |
|---|---|---|
| 2015/0138451 A1 | 5/2015 | Amitai |
| 2015/0138646 A1 | 5/2015 | Tatsugi |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2016/0031456 A1 | 2/2016 | Kissel, Jr. |
| 2016/0116739 A1 | 4/2016 | TeKolste et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0274361 A1 | 9/2016 | Border et al. |
| 2016/0282622 A1 | 9/2016 | Hiraide |
| 2016/0313567 A1 | 10/2016 | Kurashige |
| 2016/0341964 A1 | 11/2016 | Amitai |
| 2016/0349518 A1 | 12/2016 | Amitai et al. |
| 2017/0003504 A1 | 1/2017 | Vallius |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0122725 A1 | 5/2017 | Yeoh |
| 2017/0248750 A1* | 8/2017 | Curtis ............... G02B 27/0081 |
| 2017/0276947 A1 | 9/2017 | Yokoyama |
| 2017/0285346 A1 | 10/2017 | Pan |
| 2017/0293140 A1 | 10/2017 | Cai et al. |
| 2017/0315358 A1 | 11/2017 | Masuda |
| 2017/0336636 A1 | 11/2017 | Amitai et al. |
| 2017/0357095 A1 | 12/2017 | Amitai |
| 2017/0357100 A1 | 12/2017 | Ouderkirk et al. |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0101087 A1 | 4/2018 | Shiohara |
| 2018/0143509 A1 | 5/2018 | Oh |
| 2018/0157057 A1 | 6/2018 | Gelberg et al. |
| 2018/0210202 A1* | 7/2018 | Danziger ............... H04N 5/74 |
| 2018/0267317 A1 | 9/2018 | Amitai |
| 2018/0275384 A1 | 9/2018 | Danziger et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0029392 A1 | 1/2019 | Carraro |
| 2019/0056593 A1 | 2/2019 | Bablumyan |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0081246 A1 | 3/2020 | Olkkonen et al. |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0225484 A1 | 7/2020 | Takagi et al. |
| 2020/0241308 A1 | 7/2020 | Danziger et al. |
| 2020/0249481 A1 | 8/2020 | Danziger et al. |
| 2020/0278554 A1 | 9/2020 | Vuzix |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033774 A1 | 2/2021 | Tanaka |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Svensson et al. |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0149199 A1 | 5/2021 | Guan et al. |
| 2021/0271006 A1 | 9/2021 | Ronen et al. |
| 2022/0004007 A1 | 1/2022 | Bhakta et al. |
| 2022/0107499 A1 | 4/2022 | Amitai |
| 2022/0317467 A1 | 10/2022 | Danziger |

OTHER PUBLICATIONS

Petros Stavroulakis et al: "Suppression of backscattered diffraction from sub-wavelenght "moth-eye" arrays References and Links/ Optics Express 1", Endeavour Nanotechnology Zoolog_ Sci_ Philos_ Trans_ J_ Mod_ Opt Appl ppt. Opt. Acta {Lond.) Appl. Opt. Appl. Opt. Opt. Lett. Jpn.□Appl. Pjys. J. Ceram. Soc. Jpn. Opt. Commun. App;. Opt ppt. Lett. Nanotechno, Jan. 1, 1967, pp. 79-84.

Chin-Hao Chang el al: "Nanostructured gradient-index antireflection diffractive optics", Optics Letters, vol. 36, No. 12, Jun. 5, 2011, p. 2354.

Piaoyin Yang et al: "Antireflection effects at nanostructured material interfaces and the suppression of thin-film interference", Nanotechnology, vol. 24, No. 23, May 15, 2013, p. 235202.

R.. J_ Weiblen el al: "Optimized moth-eye anti-reflective structures for As_2S_3 chalcogenlide optical fibers", Optics 5 Express vol. 24, Issue 10, pp. 10172-10187 (2016) •https://doi.org/10.1364/OE.24. 010172.

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

Israel Office Action for IL 301401 mailed on Jul. 23, 2025.

* cited by examiner

COMPOUND LIGHT-GUIDE OPTICAL ELEMENTS

FIELD OF THE INVENTION

The present invention relates to optical systems and, in particular, it concerns an optical system for displaying an image to a user.

BACKGROUND OF THE INVENTION

Various types of displays, and particularly near-eye displays (NED), typically employ one or more waveguides in which an image is injected from an image projector so as to propagate within the waveguide by total internal reflection (TIR), and is subsequently coupled out towards an observer's eye via one or more coupling-out elements (e.g., partially-reflecting internal surfaces ("facets"), a diffraction grating, etc.). Such waveguides are made of a transparent substrate having a pair of parallel major external surfaces extending along the length of the waveguide between which the image and its conjugate are reflected. The image is preferably a collimated image, and the waveguide is preferably planar. For best performance, both the image and its conjugate should completely fill the waveguide, so that illumination corresponding to each pixel of the image and each pixel of the conjugate image is present at every point within the thickness of the waveguide (for areas of the waveguide that contribute to the output image that can reach the eye of the user).

Filling of the waveguide can be achieved by providing a coupling-in prism with a coupling-in surface which is oriented roughly perpendicular to the chief ray of the injected image, allowing the image to fall on an extended region of one surface of the waveguide so as to generate the conjugate image. However, particularly for implementations with images injected at relatively shallow-angles relative to the major external surfaces (i.e., close to 90 degrees to the normal of the surface), the length of the coupling-in region required to fill the waveguide with the conjugate image adds significantly to the dimensions of the waveguide. This is illustrated in FIG. 2A which illustrates a typical coupling-in to a waveguide 10. A coupling-in prism 14 cut from the waveguide substrate or attached thereto is used to direct rays 40, 41 into the waveguide at shallow angles. As rays 40, 41 propagate within the waveguide, ray 41 is reflected off the top surface of the waveguide thereby becoming the conjugate of ray 40. As is apparent from FIG. 1, even with the coupling-in prism, a relatively large input aperture (and consequently larger projector) is required in order to produce the conjugates of shallow rays within the waveguide.

Figure 2A:
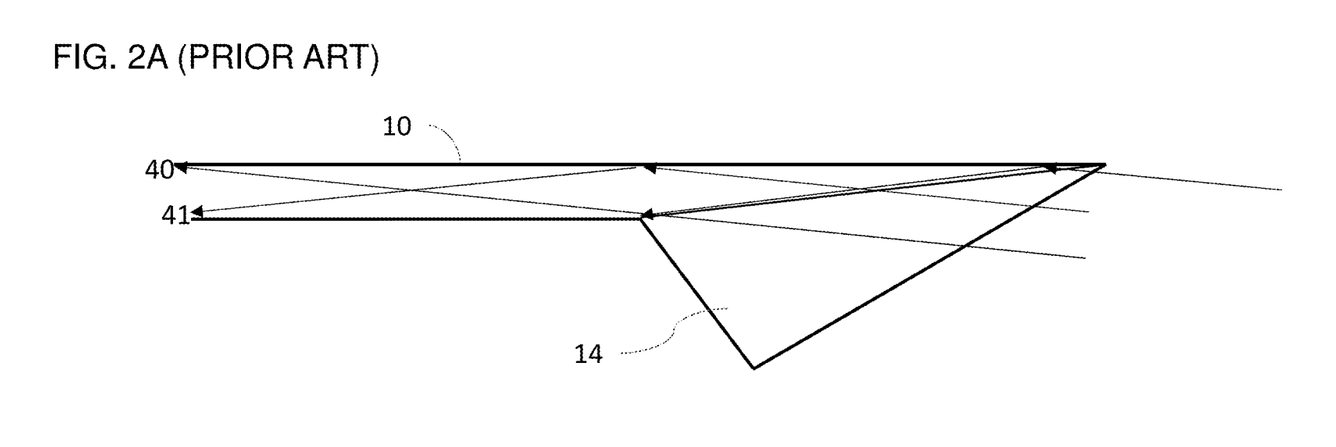
FIG. 2A, described above, is a schematic side view illustrating conventional coupling-in of an image into an LOE via a coupling prism.
Figure 2B:
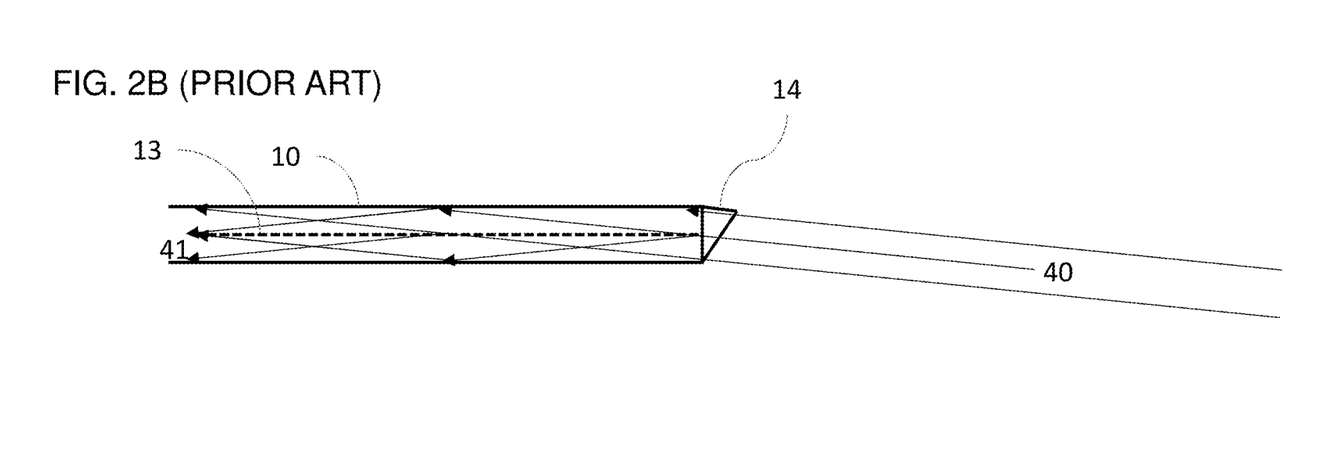
FIG. 2B, described above, is a schematic side view illustrating conventional coupling-in of an image into an LOE having an integrated beam multiplier.

An alternative approach for filling the waveguide illustrated in FIG. 2B employs a 50% beam splitter (or "mixer") 13 internally in the waveguide 10 at about the midpoint subdividing the thickness of the waveguide between the major external surfaces and extending at least part of the way along the length of the waveguide parallel to the external surfaces. The beam splitter is effective to partially reflect rays to generate the conjugates thereof (e.g., ray 41) within the waveguide and allows for a smaller input aperture and wedge prism 14, as shown in FIG. 2A.

Although the presence of mixer 13 allows use of a smaller projector aperture and coupling prism, the mixer itself adds significantly to the dimensions of the waveguide. The minimal length required of mixer 13 can be expressed by the equation $l_{mini} = w \cdot \tan(\phi)$, where w is the width of the waveguide and $\phi$ is propagation of the angle of field (relative to the normal of the LOE major surfaces). Thus, the above constraints on the minimal length of the mixer requires making the waveguide longer to accommodate the mixer. Additionally, the incorporation of the mixer inside the waveguide requires greater accuracy in the production of the waveguide due to the required parallelism with the waveguide surfaces.

SUMMARY OF THE INVENTION

The present invention is an optical system for directing an image towards a user for viewing.

According to the teachings of an embodiment of the present invention there is provided, an optical system for directing an image towards a user for viewing, the optical system comprising: (a) a light-guide optical element (LOE) formed from transparent material and having first and second mutually-parallel major external surfaces for supporting propagation of an image by internal reflection at the first and second major external surfaces, the LOE having a coupling-out arrangement for coupling out the image towards an eye of the user, the LOE having a coupling-in aperture; (b) an image projector comprising an image generator for generating an image, collimating optics for collimating the image, and an image conjugate generator, the image projector being coupled to the coupling-in aperture so as to introduce into the coupling-in aperture the collimated image and its conjugate image prior to the collimated image and the conjugate image impinging on either of the first or second major external surfaces.

According to a further feature of an embodiment of the present invention, the image conjugate generator comprises a second image generator.

According to a further feature of an embodiment of the present invention, the image conjugate generator comprises at least one reflecting surface non-contiguous with the first and second major external surfaces.

According to a further feature of an embodiment of the present invention, the image conjugate generator comprises at least one reflecting surface non-parallel to the first and second major external surfaces.

According to a further feature of an embodiment of the present invention, the image conjugate generator comprises a beam multiplier comprising at least one beam splitter deployed between, and parallel to, two reflecting surfaces.

According to a further feature of an embodiment of the present invention, the beam multiplier comprises at least two of the beam splitters interposed between at least three of the reflecting surfaces.

According to a further feature of an embodiment of the present invention, the beam multiplier has an external thickness which differs from a thickness of the LOE.

According to a further feature of an embodiment of the present invention, the reflecting surfaces of the beam multiplier are reflective surfaces at an interface between layers of a layered structure, and wherein external surfaces of the layered structure are optically non-functional surfaces of the beam multiplier.

According to a further feature of an embodiment of the present invention, the LOE further comprises a coupling-in reflector deployed obliquely to the first and second major external surfaces, the coupling-in reflector being deployed to redirect the collimated image to impinge on the first major external surface and the conjugate image to impinge on the second major external surface.

According to a further feature of an embodiment of the present invention, the coupling-in reflector is deployed at 45 degrees to the first and second major external surfaces.

According to a further feature of an embodiment of the present invention, the image conjugate generator comprises a reflecting surface that traverses the LOE adjacent to the coupling-in reflector, a part of the reflecting surface that traverses the LOE being an angularly-selective reflecting surface.

According to a further feature of an embodiment of the present invention, the angularly-selective reflecting surface is implemented using an optical adhesive having a refractive index lower than a refractive index of the LOE adjacent to the coupling-in reflector.

There is also provided according to an aspect of the present invention, an optical beam multiplier comprising a stack of transparent plates defining a plurality of parallel interface planes, the plurality of parallel interface planes being provided with coatings that define: (a) a set of N reflectors, where N is at least three; (b) a set of at least N−1 partially-reflecting beam splitters, each of the beam splitters being interposed between two adjacent reflectors of the set of reflectors.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an optical system for directing an image towards a user for viewing.

Certain embodiments of the present invention provide an optical system including a light-guide optical element (LOE) for achieving optical aperture expansion for the purpose of a head-up display, and most preferably a near-eye display, which may be a virtual reality display, or more preferably an augmented reality display.

Figure 1A:
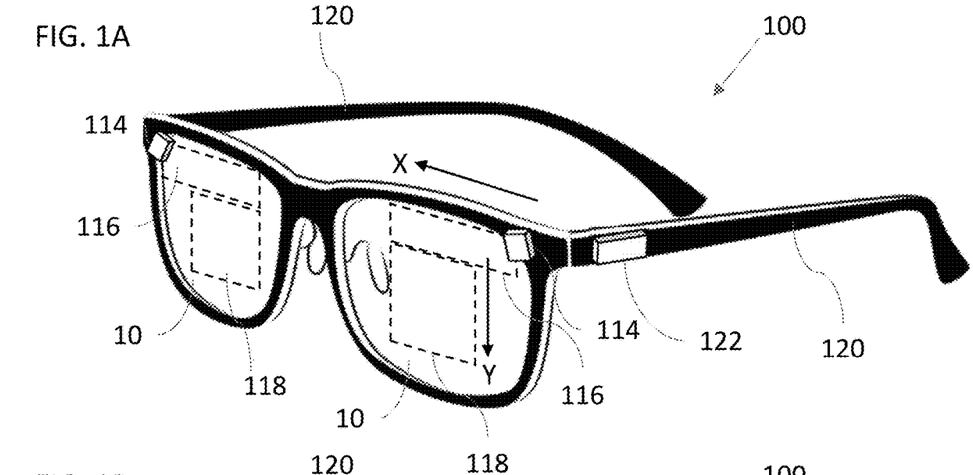
FIGS. 1A and 1B are schematic isometric views of an optical system, constructed and operative according to the teachings of the present invention, implemented using a light-guide optical element (LOE), illustrating a top-down and a side-injection configuration, respectively.
Figure 1B:
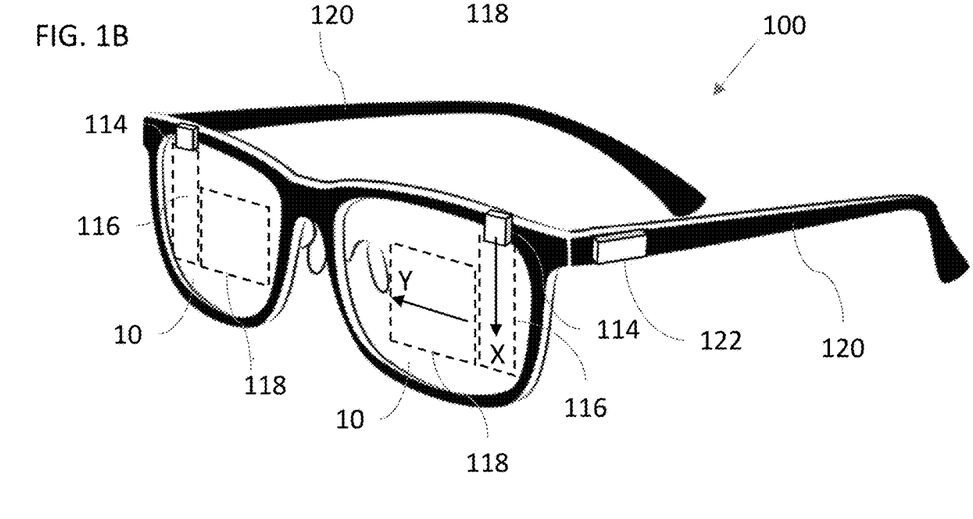

An exemplary implementation of a device in the form of a near-eye display according to the teachings of an embodiment of the present invention, generally designated 100, employing an LOE 10, is illustrated schematically in FIGS. 1A and 1B. The near-eye display 100 employs a compact image projector (or "POD") 114 optically coupled so as to inject an image into LOE (interchangeably referred to as a "waveguide," a "substrate" or a "slab") 10 within which the image light is trapped in one dimension by internal reflection at a set of mutually-parallel planar external surfaces.

Optical aperture expansion is achieved within LOE 10 by one or more arrangement for progressively redirecting the image illumination, typically employing a set of partially-reflecting surfaces (interchangeably referred to as "facets") that are parallel to each other, and inclined obliquely to the direction of propagation of the image light, with each successive facet deflecting a proportion of the image light into a deflected direction. For one-dimensional aperture expansion, the facets also couple-out the image light towards the eye of the user. In some cases, as illustrated here, two-dimensional aperture expansion is achieved by employing a first set of facets in region 116 to progressively redirect the image illumination within the LOE, also trapped/guided by internal reflection. The deflected image illumination then passes into a second substrate region 118, which may be implemented as an adjacent distinct substrate or as a continuation of a single substrate, in which a coupling-out arrangement (for example, a further set of partially reflective facets) progressively couples out a proportion of the image illumination towards the eye of an observer located within a region defined as the eye-motion box (EMB), thereby achieving a second dimension of optical aperture expansion. Similar functionality may be obtained using diffractive optical elements (DOEs) for redirecting and/or coupling-out of image illumination within one or both of regions 116 and 118, as is known in the art.

The overall device may be implemented separately for each eye, and is preferably supported relative to the head of a user with the each LOE 10 facing a corresponding eye of the user. In one particularly preferred option as illustrated here, a support arrangement is implemented as an eye glasses frame with sides 120 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B. In very approximate terms, the first LOE, or first region 116 of LOE 10, may be considered to achieve aperture expansion in the X direction while the second LOE, or second region 118 of LOE 10, achieves aperture expansion in the Y direction. The details of the spread of angular directions in which different parts of the field of view propagate will be addressed more precisely below. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded. The two-dimensional expansion embodiments illustrated here are merely exemplary, but the invention is also applicable to embodiments in which only a single dimension of aperture expansion is performed by the LOE.

It will be appreciated that the near-eye display 100 includes various additional components, typically including a controller 122 for actuating the image projector 114, typically employing electrical power from a small onboard battery (not shown) or some other suitable power source. It will be appreciated that controller 122 includes all necessary electronic components such as at least one processor or processing circuitry to drive the image projector, all as is known in the art.

An aspect of the present invention relates to an implementation of image projector 114 which includes an image conjugate generator arranged so that the image projector injects both the collimated image and its conjugate image into the LOE 10. Various non-limiting examples of the image conjugate generator will be illustrated herein below with reference to FIGS. 3-8.

Figure 3:
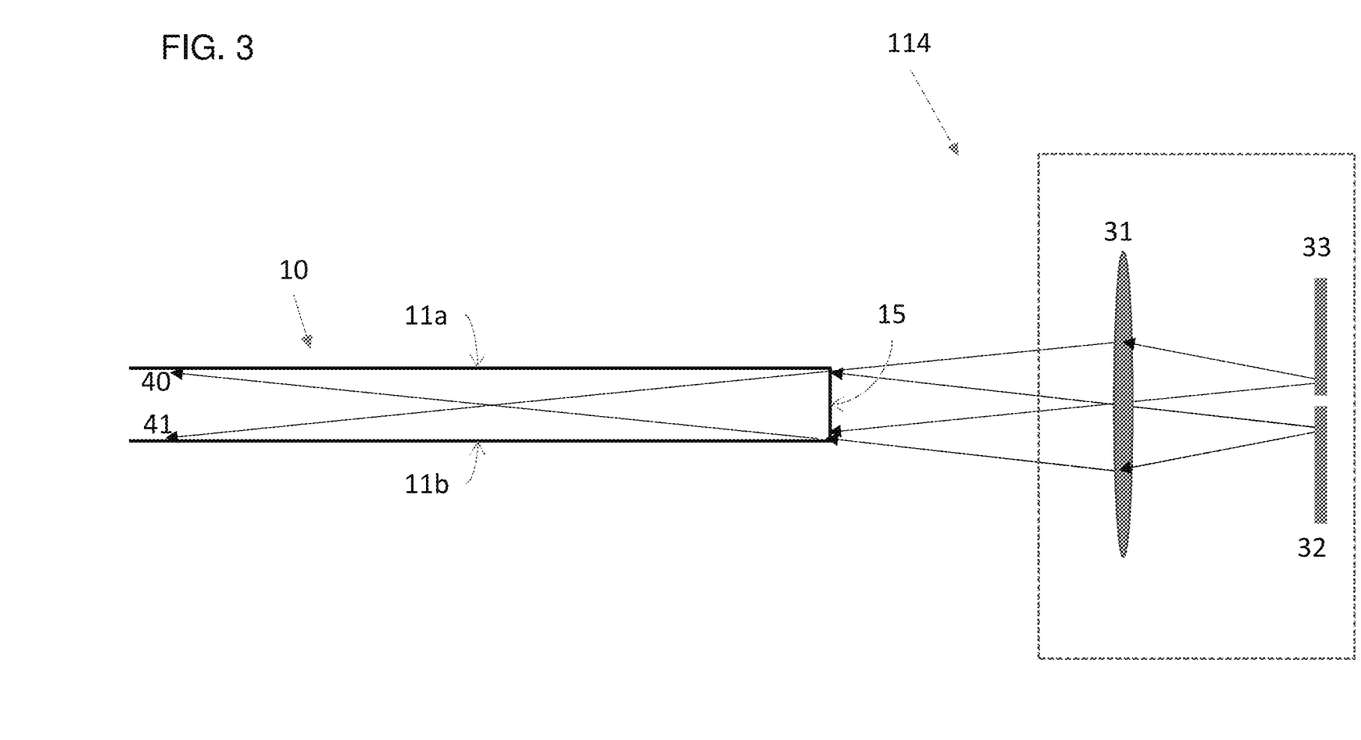
FIG. 3 is a schematic side view of a part of the optical system of FIGS. 1A and 1B illustrating coupling-in to the LOE of an image-conjugate image pair.

Thus, referring to FIG. 3, there is shown an enlarged schematic partial view of the optical system of FIG. 1 for directing an image towards a user for viewing. The optical system includes LOE 10 formed from transparent material and having first and second mutually-parallel major external surfaces 11a and 11b for supporting propagation of an image by internal reflection at those surfaces. LOE 10 also has a coupling-out arrangement (in region 118 of FIG. 1, as described above and not shown here) for coupling out the image towards an eye of the user, and a coupling-in aperture 15 which, in this case, is shows as a side edge of LOE 10.

Instead of relying upon structures integrated with the LOE 10 to generate the image-conjugate pair, an image projector 114 according to this aspect of the present invention includes an image conjugate generator to generate the image-conjugate pair prior to either the collimated image or the conjugate image impinging on either of the major external surfaces 11a and 11b of LOE 10.

Thus, in the example of FIG. 3, image projector 114 includes an image generator 32 for generating an image, collimating optics 31 for collimating the image, and an image conjugate generator, here implemented as a second image generator 33 that generates the conjugate image. In the example illustrated here, image generators 32 and 33 share common collimating optics 31. Image projector 114 is coupled to coupling-in aperture 15 so as to introduce the collimated image and its conjugate image directly into LOE 10 prior to the collimated image or its conjugate image impinging on either of the major external surfaces 11a and 11b of LOE 10.

It will be appreciated that this solution contrasts clearly with the coupling-in arrangements of FIGS. 2A and 2B, where the conjugate image is generated within the LOE itself by reflections from the major external surfaces (or surfaces of a coupling prism which are a continuation of those surfaces and are defined for this purpose herein to be part of the major external surfaces of the LOE).

The two image generators 32 and 33 are driven to generate the same image with one inverted, and each field is identically shown from both fields. During assembly of the device, active alignment is preferably used, either by mechanical adjustment or more preferably by digital correction of the image display position, to move the two images on the image generators so that they are aligned as complementary conjugate images within the LOE. The LOE is thus "filled" with both the primary image and its conjugate from the coupling-in aperture onwards throughout the LOE, without requiring any extension of the LOE to achieve such filling.

In this and all other implementations of the present invention, the image generator(s) may be any type of micro-display image generator known in the art. Suitable examples include, but are not limited to, spatial light modulators (SLMs) including transmissive SLMs such as LCD displays and reflective SLMs such as LCOS displays, and active light-generating displays, such as oLED displays. Scanning image generators, in which a rapidly scanning laser beam is modulated synchronously with its scanning motion, may also be used as image generators according to the present invention.

As an alternative to the second image generator 33, other implementations of the present invention implement the image conjugate generator as at least one reflective surface non-contiguous with the major external surfaces to generate the conjugate image. Various examples of such implementations are presented with reference to FIGS. 4A-8.

Figures 4A, 4B:
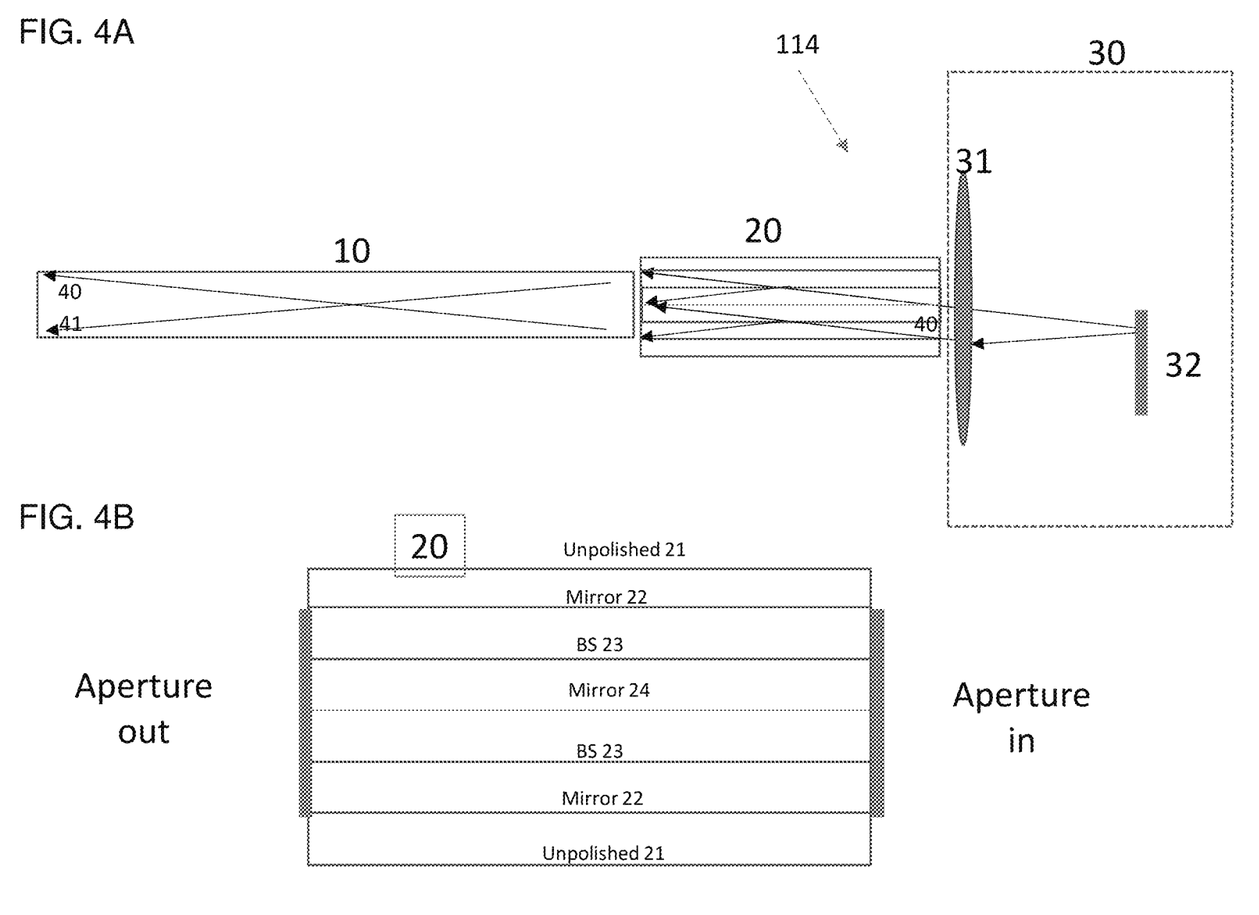
FIG. 4A is a schematic side view of a part of the optical system of FIGS. 1A and 1B illustrating an alternative implementation of the present invention employing a beam multiplier.
FIG. 4B is an enlarged schematic view of the beam-multiplier of FIG. 4A.

FIG. 4A illustrates an implementation in which the image conjugate generator is a beam multiplier or "mixer" configuration 20 that is external to the waveguide 10. One particularly preferred implementation of mixer 20, which is considered patentable in its own right, is shown in more detail in FIG. 4B.

Conceptually, mixer 20 performs a function similar to that of mixer 13 of FIG. 2B, but in this case, it is not part of the waveguide 10 but rather part of the assembly of the image projector assembly 114, positioned between the LOE 10 and the projector unit 30 containing the image generator and collimating optics. In this case, the projector unit 30 has a single image generator 32 that produces one image, while mixer 20 produces the image-conjugate pair by partially reflecting ray 40 to produce the conjugate (ray 41). The image pair is then injected into the waveguide. Because mixer 20 is external to the waveguide, it can be actively aligned with the waveguide during assembly without imposing manufacturing constraints on the waveguide. Mixer 20 can include multiple layers of mirrors 22, 24 and beam splitters 23, as well as outer surfaces 21, which need not be of optical quality and need not be coplanar with the LOE external surfaces. This greatly simplifies the manufacturing constraints on the structure.

Regarding the structure of beam multiplier 20, the beam multiplier of the present invention is distinguished from those described in prior publications by the presence of at least one intermediate highly-reflective layer, effectively subdividing the mixer into two independent mixers stacked one above the other. Thus, optical beam multiplier 20 is preferably formed from a stack of transparent plates defining a plurality of parallel interface planes which are coated so as to define:

(a) a set of N reflectors, where N is at least three;
(b) a set of at least N−1 partially-reflecting beam splitters, each of the beam splitters being interposed between two adjacent reflectors of the set of reflectors.

The "reflectors" in this case are preferably highly reflective, meaning that they reflect at least 85%, more preferably at least 90%, and typically at least 95%, of incident light, at least in the angular range that is relevant for propagation along the LOE. The partially-reflecting beam splitters are preferably roughly 50% reflectors (50%±10%). In applications in which the beam multiplier is outside the field of view of the user, both the reflectors and the beam splitters can advantageously be implemented using metallic coatings. Where transparency is required for viewing a scene through the beam multiplier, multilayer dielectric coatings are employed to provide the required levels of reflectivity at high angles, while providing relatively high transparency at small (near-orthogonal) angles, as is known in the art.

The intermediate reflector(s) effectively subdivide the mixer into two (or more) sub-mixers. This decreases by a factor of two the length needed for the mixer to achieve filling of the waveguide with the image and its conjugate. The input and output apertures of mixer 20 according to one example are shown as dark lines in FIG. 4B. These apertures do not need to fill the entire width of the mixer. In fact, it may be advantageous for all of the reflectors and beam splitters to be implemented at internal interface planes between transparent plates, while the external surfaces of the layered structure are optically non-functional surfaces. "Optically non-functional" here refers to surfaces which are not reached by the image light, or that any image light reaching them does not subsequently enter the LOE. In such a case, the outer surfaces need not be polished surfaces, and do not need to be parallel to other elements. Thus, as illustrated in FIG. 4A, the external thickness of mixer 20 may be different, typically larger, than the thickness (i.e., distance between first and second major external surfaces 11a and 11b) of LOE 10. The distance between the outermost reflectors 22 should match, or be slightly greater, than the LOE thickness, in order to fill the LOE.

Turning now to FIGS. 5-8, in some implementations, the use of an external image conjugate generator facilitates the use of a folded light path, thereby removing bulk from the lateral sides of the assembly. Thus, according to certain embodiments of the present invention, LOE 20 further includes a coupling-in reflector 12 deployed obliquely to the first and second major external surfaces to as to redirect the collimated image to impinge on the first major external surface 11a and the conjugate image to impinge on the second major external surface 11b. The coupling-in reflector 12 may be implemented at a range of angles, but is most preferably deployed at 45 degrees to the first and second major external surfaces, thereby effectively folding the optical axis of the image projector through 90 degrees. Unlike certain conventional coupling-in configurations, reflector 12 is specifically located within the thickness of the LOE 20, so that it can deflect both the primary image and its conjugate image towards their respective up/down propagation directions.

Figure 5:
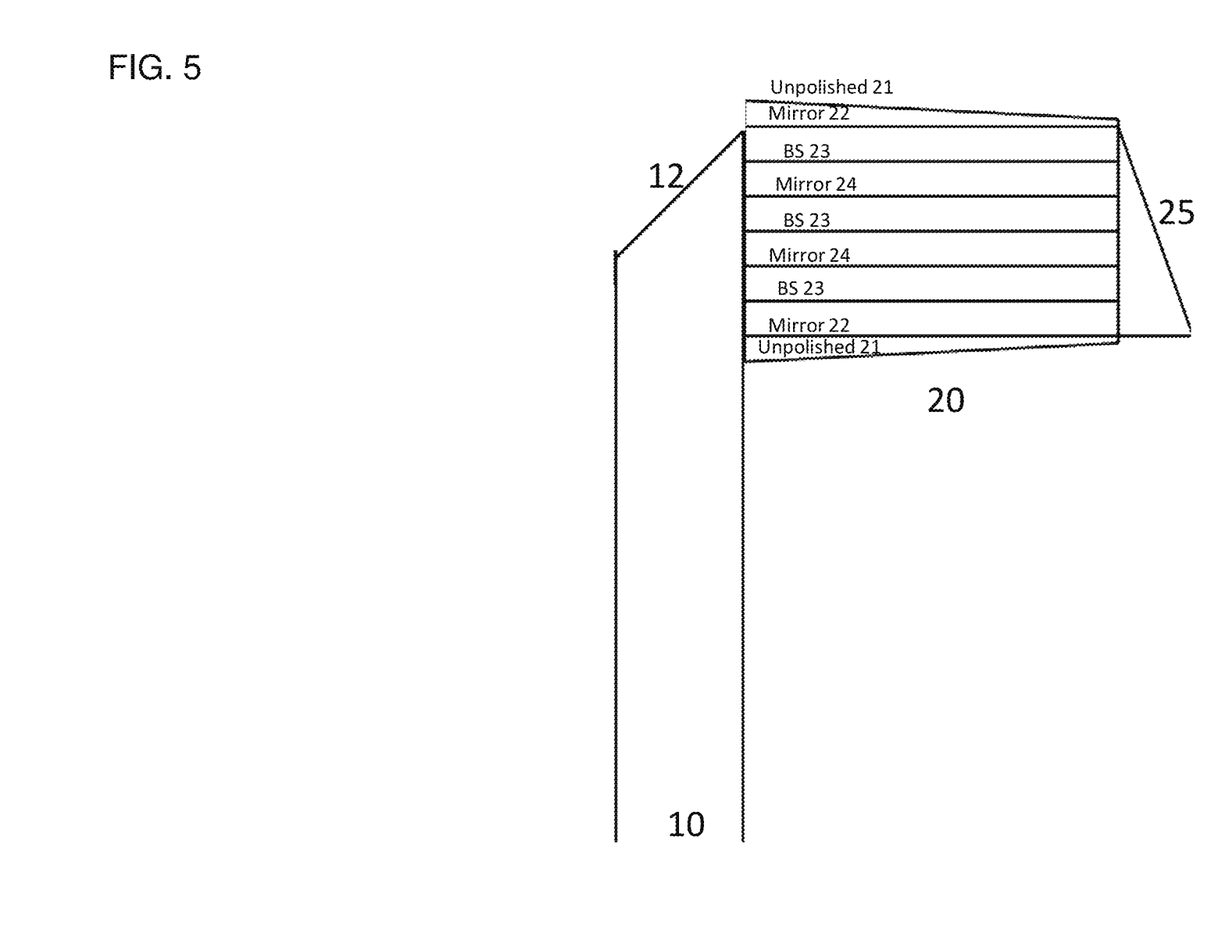
FIG. 5 is a schematic side view of a part of the optical system of FIGS. 1A and 1B illustrating an alternative implementation of the present invention employing a beam multiplier and an obliquely-angled coupling-in reflector.

FIG. 5 illustrates one such configuration in which external mixer 20 is positioned perpendicular to the waveguide. In this case, a 45-degree reflective coupling-in surface 12 folds the image exiting the mixer into the waveguide. A wedge prism 25 is preferably used to couple-in the central FOV light into the mixer at an angle normal to the prism surface. Due to the folding, the aperture width of the mixer must be larger than that of the waveguide. The exact size of the aperture depends on the angular FOV of the displayed light and the angle of folding of surface 12. In this example, the width increases by 66%.

It should be noted that in this case, the mixer 20 is divided into three sub-mixers. As a result, the length of the mixer does not need to be increased (since as mentioned $l_{mini}=w \cdot \tan(\phi)/2$, and after folding the width (w) is increased by 60%). Hence, the mixer is divided into three sub-mixers by two internal mirror facets 24 between the external mirror facets 22. A beam splitter 23 is provided at the center plane of each sub-mixer.

Figure 6:
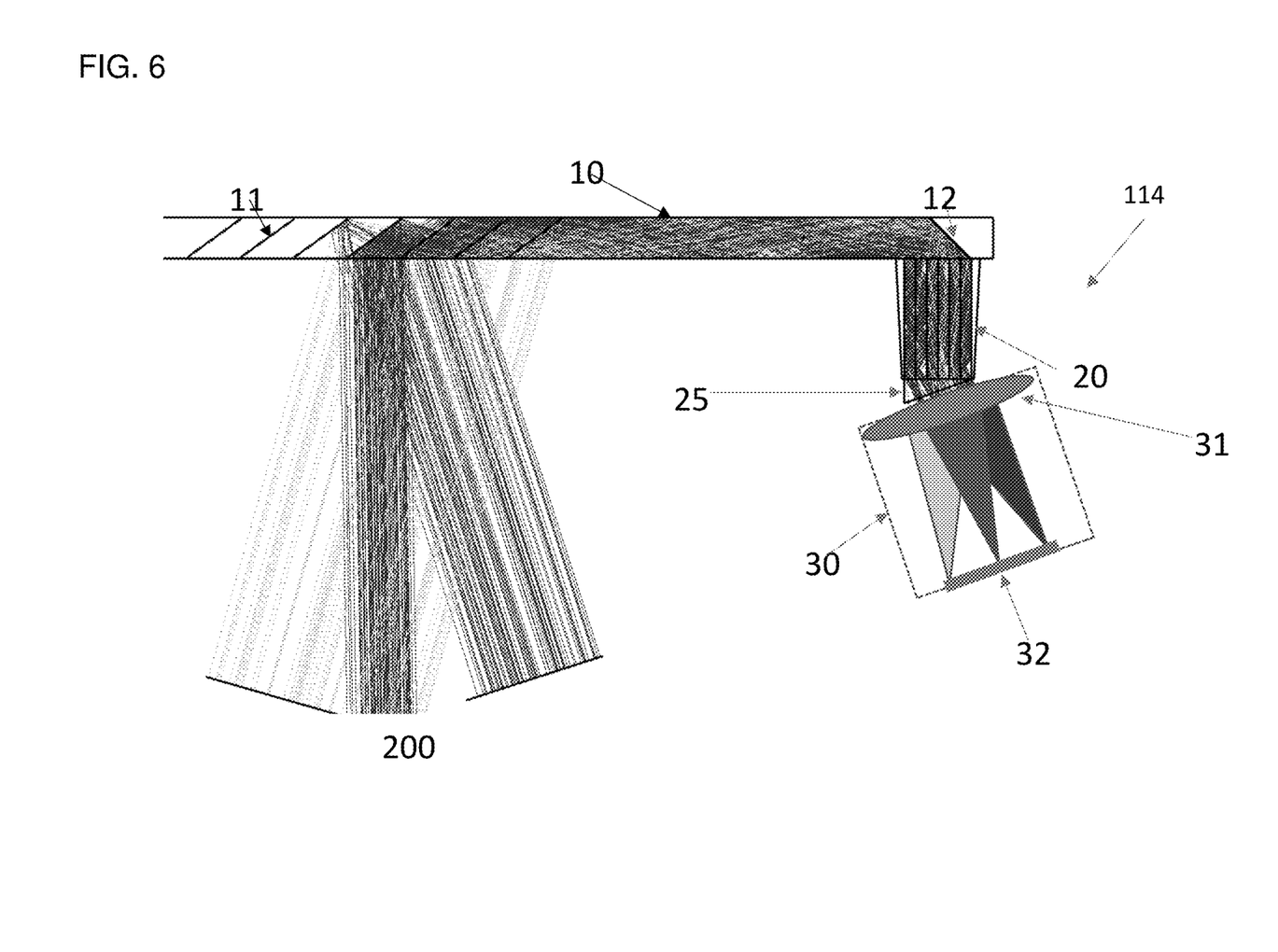
FIG. 6 is a ray-trace diagram for an implementation of the present invention according to FIG. 5 illustrating ray paths for different parts of an image directed towards an eye of a user.

FIG. 6 shows a light path diagram of an overall optical system incorporating the mixer of FIG. 5. Three exemplary points (pixels) on image generator 32 are collimated by lens 31 to exit projector unit 30 into coupling wedge prism 25 and into mixer 20. The mixer generates the conjugate fields, such that the entire image and its conjugate are coupled into waveguide 10 by coupling-in reflector 12. In this example, the light is coupled out of the waveguide to an eye motion box (EMB) 200 by a set of parallel partially reflecting facets 11. It should be noted that the example of facets 11 is only one non-limiting example, and other mechanisms of coupling-out, for example, holographic or dichroic gratings, are also possible and included within the scope herein. Finally, one can see that, although the angle of propagation of different fields can be very shallow, the input aperture between mixer 25 and projector unit 30 remains relatively small.

Figure 7A:
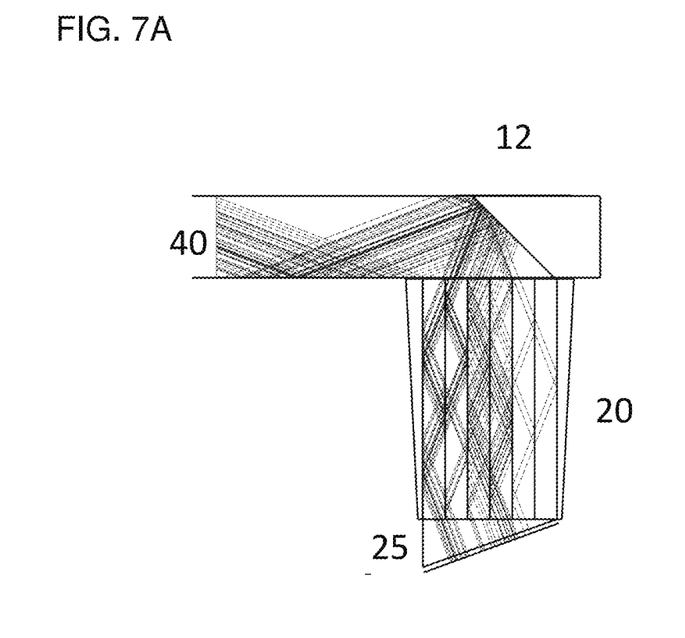
FIGS. 7A and 7B are enlarged partial views of a coupling-in region of the LOE from FIG. 6 each showing only half of the ray paths for a single image pixel, contributing to filling of the LOE with corresponding image illumination for that pixel.
Figure 7B:
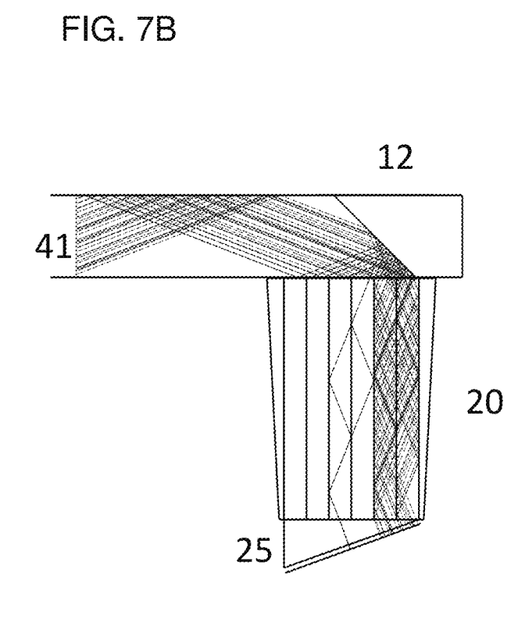

FIGS. 7A and 7B show two cross-sectional views of the image (FIG. 7A) and its conjugate (FIG. 7B) propagating within the waveguide. Overlaying FIGS. 7A and 7B demonstrates how the waveguide is completely filled with the image and its conjugate. As such, light homogenization is achieved within the waveguide. It should be noted that this illustration subdivides the illumination into "image" and "conjugate" according to an arbitrary location part-way along the LOE, but the light is constantly interchanging between image and conjugate as it is reflected from the first and second major external surfaces of the LOE as it propagates. A particular defining feature of one particularly preferred aspect of the present invention is that the illumination entering the coupling-in aperture of the LOE and reaching coupling-in reflector 12 already includes filling of the reflector with both the image and the conjugate image, one of which is directed upwards as shown, to impinge first on the first major external surface 11a, and the other of which is directed downwards as shown, to impinge first on the second major external surface 11b. The definitions of which image is the "primary image" and which is the "conjugate image", as well as which surface is called the "first" or "second" major external surface, are arbitrary, and it is generally inconsequential whether the "primary image" generated by the image generator is the image to be viewed by the user or an inverted version of that image, depending only on various design considerations.

It will be noted that some of the downward-directed rays reflected from coupling-in reflector 12 as seen in FIG. 7B impinge on the second major external surface 11b in a region overlapped by beam multiplier 20. In order to maintain TIR in that region of overlap, the device is preferably assembled either with a small air gap between the elements or, more preferably, using a low refractive-index adhesive between the components. Particularly for shallow-angle ray propagation, a relatively small difference in refractive index between the material of the LOE and the adhesive is sufficient to define a critical angle which will retain the propagating image illumination by TIR. Alternatively, an angularly-selective multilayer dielectric coating may be applied to the area of overlap with the LOE to provide suitable internal reflection properties.

In all of the above embodiments employing mixer 20, the mixer is arbitrarily defined herein functionally to be part of the projector 114, since it forms part of the optical system prior to injection of the images into the LOE 10 and does not include an extension of any surface of the LOE. In practical construction of a product, the mixer is not necessarily integrated with the projector unit 30 which combines the image generator and collimating optics, and may in some cases be more conveniently assembled by attachment to the LOE prior to positioning of the projector unit.

Figure 8:
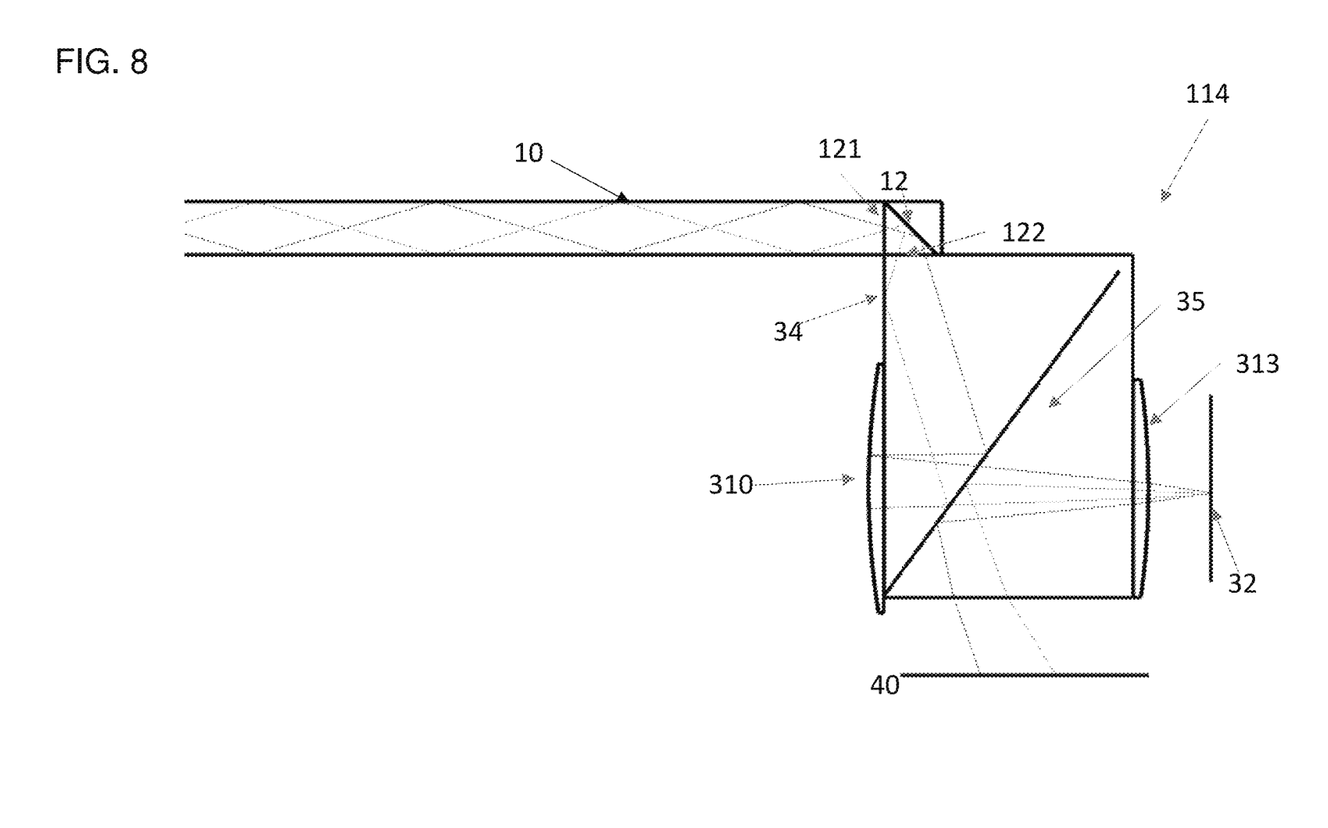
FIG. 8 is a schematic side view of a part of the optical system of FIGS. 1A and 1B illustrating an alternative implementation of the present invention employing a reflector surface which traverses a thickness of the LOE as an angularly-selective reflector.

FIG. 8 illustrates a further feature of certain particularly preferred implementations of the present invention. According to this feature, the image conjugate generator includes a reflecting surface 34 that traverses a thickness of the LOE 10 adjacent to the coupling-in reflector 12. A part 121 of reflecting surface 34 that traverses the LOE is implemented as an angularly-selective reflecting surface, so as to reflect rays entering the LOE from projector 114 prior to reflection at reflector 12, while transmitting rays already reflected by reflector 12, i.e., at angles relevant for image propagation along LOE 20. Here too, the angularly-selective reflecting surface can most conveniently be implemented using an optical adhesive having a refractive index lower than a refractive index of the LOE adjacent to the coupling-in reflector, thereby providing a critical angle lying between the angles of incidence of the rays prior to, and after, reflection at reflector 12. The other options mentioned above, such as use of angularly-selective multilayer dielectric coatings, or inclusion of an air gap, could also be used.

In the non-limiting example illustrated in FIG. 8, projector 114 generates the conjugate image by use of a single extended reflecting surface 34 perpendicular to the major external surfaces of the LOE, rather than via an external mixer. Part of the projected collimated image is incident directly on coupling-in reflector 12, corresponding to the primary image which is deflected upwards toward first major external surface 11a. Another part of the image reflects from surface 34, thereby generating the conjugate image, which is deflected by coupling-in reflector 12 downwards towards second major external surface 11b. Reflecting surface region 121 contributes to filling of coupling-in reflector 12 with the conjugate image, while overlap region 122 is similarly treated to provide angularly-selective reflection, to avoid leakage of the downwardly-reflected conjugate image light in the region of overlap (as described above).

Other aspects of the structure of projector 114 of FIG. 8 are based on principles employed in conventional reflective-SLM image projectors based on polarizing beam splitter prisms. Specifically, an illumination source 40 introduces illumination into a PBS prism 35 where the light is reflected towards a reflective SLM 32, such as an LCOS, DLP etc. The reflected image illumination passes through the PBS to a reflective collimating lens 310 associated with a quarter wave plate (not shown), so that the reflected collimated image is reflected from the PBS towards the LOE coupling-in aperture. Doubling-up of the image to provide both the image and its conjugate is achieved as described above by part of the image being incident directly on reflector 12 while other image illumination is first reflected from surface 34. The region of surface 34 underlying reflective lens 310 may also advantageously be provided with an angularly-selective reflective coating, such as a low-index adhesive to achieve TIR at the relevant angles after reflection from the PBS. Other lenses could be added to improve the optical performances, such as a field lens 313.

In this implementation, it is particularly advantageous that prism face 34 be orthogonal to the major surfaces of the waveguide 10, and the two parallel rays illustrated here leaving reflecting lens 310 will be conjugated before entering the waveguide. Furthermore, it could be seen that the required input direction of the illumination from source 40 is about 110 degrees relative to the waveguide's major surfaces, lending itself to a highly ergonomic design with slight divergence between the components which are to be integrated on either side of the device, as is well-suited to a glasses-frame form factor.

The use of a reflective surface 34 which traverses the thickness of the LOE at region 121 with angularly-selective reflective properties is applicable also to other implementations of the invention described above. For example, if one of the reflectors of the beam multiplier 20 of FIGS. 5-7B is implemented as a surface which traverses the thickness of LOE 20, the required optical input and output apertures of the beam multiplier 20 can be significantly reduced, resulting in a more compact design.

It will be appreciated that the above descriptions are intended only to serve as examples, and that many other embodiments are possible within the scope of the present invention as defined in the appended claims.

What is claimed is:

1. An optical system for directing an image towards a user for viewing, the optical system comprising:
    (a) a light-guide optical element (LOE) formed from transparent material and having first and second mutually-parallel major external surfaces for supporting propagation of an image by internal reflection at said first and second major external surfaces, said LOE having a coupling-out arrangement for coupling out the image towards an eye of the user;
    (b) an image projector comprising an image generator for generating an image and collimating optics for collimating the image, the collimated image being directed in a projector output direction; and
    (c) a reflective coupling-in arrangement comprising an internal reflector deployed within said LOE obliquely to said major external surfaces and an extended reflector extending outwards from said LOE non-parallel to said internal reflector and to said major external surfaces,
said image projector being coupled to said LOE so as to direct a first part of the light corresponding to the collimated image propagating along the projector output direction so as to impinge on said internal reflector without reflection at said extended reflector and to be deflected by said internal reflector at angles that impinge on, and undergo internal reflection at, said first major external surface, and so as to direct a second part of the light corresponding to the collimated image propagating along the projector output direction to undergo reflection at said extended reflector to form a conjugate of the collimated image directed so as to impinge on said internal reflector and to be deflected by said internal reflector at angles that impinge on, and undergo internal reflection at, said second major external surface.

2. The optical system of claim 1, wherein said extended reflector is perpendicular to said first and second major external surfaces.

3. The optical system of claim 1, wherein said internal reflector is deployed at 45 degrees to said first and second major external surfaces.

4. The optical system of claim 1, wherein said extended reflector traverses said LOE adjacent to said coupling-in reflector, a part of said reflecting surface that traverses said LOE being an angularly-selective reflecting surface.

5. The optical system of claim 4, wherein said angularly-selective reflecting surface is implemented using an optical adhesive having a refractive index lower than a refractive index of said LOE adjacent to said coupling-in reflector.

6. The optical system of claim 1, wherein said extended reflector is implemented at least in part by a first surface of a prism that is part of said image projector.

7. The optical system of claim 6, wherein said prism includes a polarizing beam splitter surface.

8. The optical system of claim 7, wherein said collimating optics comprises a reflective collimating lens deployed on a surface of said prism.

9. The optical system of claim 7, wherein said collimating optics comprises a reflective collimating lens deployed on said first surface of said prism.

10. The optical system of claim 9, wherein at least a region of said first surface underlying said reflective collimating lens is provided with an angularly-selective reflective coating or low-index adhesive.

* * * * *